United States Patent Office 3,573,216
Patented Mar. 30, 1971

3,573,216
HETEROCYANOACRYLATE U.V. ABSORBERS
Albert F. Strobel, Delmar, and Sigmund C. Catino, Castleton, N.Y., assignors to GAF Corporation, New York, N.Y.
No Drawing. Continuation of application Ser. No. 269,743, Apr. 1, 1963. This application Jan. 24, 1967, Ser. No. 611,471
The portion of the term of the patent subsequent to Nov. 2, 1982, has been disclaimed
Int. Cl. G02b 5/22
U.S. Cl. 252—300                  18 Claims

ABSTRACT OF THE DISCLOSURE

U.V.-degradable organic material containing an amount sufficient to prevent such degradation of certain heterocyanoacrylate U.V. absorbers.

---

This application is a continuation of our application Ser. No. 269,743 filed Apr. 1, 1963 and now abandoned.

This invention relates to new and useful compositions which are characterized as having superior resistance to degradation and deterioration when exposed to actinic radiation and in particular to organic compositions which are protected against deterioration when exposed to such radiations by the incorporation therewith of hetero cyanoacrylates. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of hetero cyanoacrylates.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered that by combining hetero cyanoacrylates with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxies, melamines and the like. While the compounds employed in the compositions of the present invention do not require an hydroxyl group, the presence thereof is not a disadvantage, or detriment where alkaline sensitivity is no problem.

It is therefore an object of the present invention to provide new and useful compositions characterized by improved resistance to degradation and deterioration by ultra-violet radiation.

It is still another object of this invention to provide compositions containing hetero cyanoacrylates which are resistant to ultra-violet deterioration.

It is a still further object of this invention to provide processes for improving the resistance of organic materials to deterioration and degradation by actinic radiation and especially ultra-violet radiation.

It is a still further object of this invention to provide compositions and processes for improving the resistance of organic materials to deterioration and degradation by actinic radiations including short wave length visible radiations.

Other objects will appear as the description proceeds.

The hetero cyanoacrylate compounds which are employed in the present invention have the following general formula:

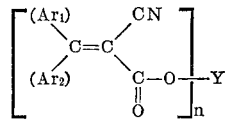

wherein $(Ar_1)$ and $(Ar_2)$ are radicals independently selected from aromatic, carbocyclic and heterocyclic nuclei and at least one of the radicals is heterocyclic having aromaticity, i.e., at least one pair of conjugated double bonds; $n$ is an integer from 1 to 2; and Y is a radical selected from the group consisting of alkyl, alkenyl, aryl, hetero and substituted derivatives thereof, e.g., haloalkyl, hydroxyalkyl, cyanoalkyl, alkoxyalkyl, carbalkoxyalkyl, haloalkenyl, hydroxyalkenyl, alkoxyalkenyl, cyanoalkenyl, carbalkoxyalkenyl, halophenyl, halonaphthyl, alkoxyphenyl, alkoxynaphthyl, alkylphenyl, halothienyl, alkylthienyl, alkylfuryl, phenylfuryl, alkoxyfuryl, alkoxypyrridyl, halopyrryl, etc., when $n=1$; and when $n=2$, Y is a bivalent bridging radical such as alkylene, arylene, hetero and substituted derivatives thereof.

Suitable (Ar$_1$) and (Ar$_2$) radicals include:

aryl:
  phenyl
  tolyl
  xylyl
  cumyl
  α-naphthyl
  β-naphthyl
  α-anthraquinonyl
  β-anthraquinonyl
  γ-anthraquinonyl
  phenanthranyl
  diphenyl and the alkyl substituted derivatives thereof substituted aryls, e.g.:
  anisole
  penetole
  p-diethoxyphenyl
  1-methoxy phenanthryl
  α-naphthylmethylether
  β-naphthylmethylether
  α-naphthylethylether
  β-naphthylethylether
  hydroxyethyl phenyl
  hydroxypropyl phenyl
  chlorophenyl
  bromophenyl
  1,2-dichlorophenyl
  1,3-dichlorophenyl
  1,3,5-trichlorophenyl
  1,2-dibromophenyl
  α-chlorotolyl
  m-chlorotolyl
  m-bromotolyl
  bromo-o-xylyl
  α,β-dichloro naphthyl
  4-bromoacenaphthyl
  carboxyphenyl
  carboxytolyls
  carboxyxylyls
  carbalkoxylphenyl, e.g.:
    carbomethoxylphenyl
    carboethoxylphenyl
  carbalkoxytolyls, e.g.:
    carbomethoxytolyls
  acetophenyl
  propiophenyl
  butyrophenyl
  lauroylphenyl
  stearoylphenyl
  p-acetotolyl
  o-acetotolyl
  α-benzoyl naphthyl
  β-benzoyl naphthyl
  acetaminophenyl
  acet-methylamino phenyl
  o-acetoaminotolyl
  p-acetoaminotolyl
  α-acetoaminonaphthyl
  β-acetoaminonaphthyl
  propio-aminophenyl
  butyro-aminophenyl
  o-propio-aminotolyl
  p-propio-aminotolyl
  o-butyroaminotolyl
  p-butyroaminotolyl
  o-lauroylaminotolyl
  p-lauroylaminotolyl
  o-stearoylaminotolyl
  p-stearoylaminotolyl
  sulfamyl phenyl
  sulfamyl naphthyl heterocyclics:
  thiophene
  furane
  pyrrole
  α-pyrane
  γ-pyrane
  pyridine
  1,2-dehydropyridine
  oxazole
  thiazole
  isoxazole
  isothiazole
  pyrazole
  3-isopyrazole
  imidazole
  1,2,3-triazole
  1,2,4-triazole
  tetrazole
  1,3,4-oxadiazole
  1,2,5-oxadiazole
  1,2,3-thiadiazole
  1,2,3-oxathiazole
  pyridazine
  pyrimidine
  pyrazine
  1,3,5-triazine and fused ring systems of benzene with the aforementioned heterocyclics, e.g.:

benzothiophene
  benzofurane
  quinoline
  phthalazine
  benzimidazole
  1,2,3-benztriazole
  benzoxazole The heterocyclic nuclei may contain inert substituents, as the aryl moiety, which do not affect the function and stability of the compounds but which may vary the ultra-violet absorption spectrum somewhat. These include:

alkyl (1 to about 50 carbon atoms)
alkenyl (1 to about 50 carbon atoms)
substituted alkyl (1 to about 50 carbon atoms) e.g., cyano-, hydroxy-, carbalkoxy-, chloro-, fluoro-, bromo-, iodo-, alkoxy-, hydroxyalkoxy-, etc.
halogen (F, Cl, Br, and I)
acyl (acetyl to about 50 carbon atoms and aroyl including multicyclics such as naphthoyl, anthranoyl, etc.)
sulfonyl (e.g., $CH_3SO_2$—; benzene $SO_2$, etc.)
oxy (OH; $CH_3O$—, etc.)
carboxamido (—CON<) and the like.

Y (when $n=1$) may be any of the aforementioned aryls and heterocyclics and also any of the alkyl, alkenyl, substituted alkyl indicated as suitable substitutents in the aryl and hetero moieties. Some specific radicals include, further:

methyl
ethyl
n-propyl
iso-propyl
n-butyl
iso-butyl
tertiary-butyl
secondary-butyl
n-amyl
iso-amyl tertiary-amyl and the other isomeric amyls
n-hexyl
iso-hexyl and the other isomeric hexyls
n-heptyl
iso-heptyl and the other isomeric heptyls
n-primary nonyl (nonyl-1)
nonyl-(2)
nonyl-(3)
nonyl-(5)
2-methyl-octyl-2
4-ethyl-heptyl-4
2-methyl-4-ethyl-hexyl-4
n-primary octyl, octyl-(2) (capryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-primary decyl (decyl-1)
decyl-4 (secondary decyl)
2-ethyl-octyl-3 (tertiary decyl)
4-propyl-heptyl-4 (tertiary decyl)
undecyl-1 (n-primary decyl)
undecyl-2 (n-secondary decyl)
dodecyl-1 (n-dodecyl)
tridecyl-1 (n-tridecyl)
tridecyl-7
3-ethyl-undecyl
tetradecyl-1 (n-tetradecyl)
pentadecyl-1 (n-pentadecyl)
pentadecyl-8
hexadecyl (cotyl)
heptadecyl-9
octadecyl-1
2-methyl heptadecyl-2
eicosyl-1
docosyl-1
tricosyl-12
tetracosyl
tricapryl
pentacosyl
hexacosyl
heptacosyl
octacosyl
nonacosyl
myrisyl (30 carbons)
alkenyl:
    allyl ($CH_2=CHCH_2-$)
    methallyl ($CH_2=C(CH_2)CH_2-$)
    crotyl ($CH_3CH=CHCH_2-$)

butenyl-1 ($CH_2=CH-CH-CH_3$)

pentenyl-1
    γ-isopropyl allyl
    β-ethyl-3-propyl allyl
    2-methyl-octenyl-6
    decenyl-1
    decenyl-2
    undecenyl
    dodecenyl-2
    octadecenyl
    docosenyl
    pentamethyl eicosenyl
substituted alkyl:
    cyanoethyl
    cyano-n-propyl
    cyano-isopropyl
    cyano-n-butyl
    cyano-isobutyl
    cyano-n-amyl
    cyano-isoamyl
    cyanohexyl
    cyanoheptyl
    cyano-n-octyl
    cyano-nonyl
    cyanodecyl
    cyanolauryl
    cyanostearyl and the like
    hydroxyethyl
    hydroxy-n-propyl
    hydroxy-isopropyl
    hydroxy-n-butyl
    hydroxy-isobutyl
    hydroxy-n-amyl
    hydroxy-isoamyl
    hydroxy-hexyl
    hydroxy-heptyl
    hydroxy-nonyl
    hydroxy-decyl
    hydroxy-lauryl
    hydroxy-stearyl and the like
    carbomethoxyethyl
    carbomethoxypropyl
    carbomethoxybutyl
    carbomethoxyamyl
    carbomethoxyhexyl
    carbethoxyethyl
    carbethoxypropyl
    carbethoxybutyl, etc.
    carbopropoxyethyl
    carbopropoxypropyl
    carbopropoxybutyl, etc.
    carbobutoxyethyl
    carbobutoxybutyl, etc.
    chloroethyl
    chloropropyl (N-propyl, isopropyl)
    chlorobutyl (N-butyl, isobutyl, etc.)
    chloroamyl
    chlorodecyl
    chlorolauryl, and the like
    bromoethyl
    bromopropyl (N-propyl, isopropyl)
    bromobutyl (N-butyl, isobutyl, etc.)
    bromoamyl
    bromohexyl
    bromodecyl
    bromolauryl, and the like
    methoxyethyl
    methoxypropyl (N-propyl, isopropyl)
    methoxybutyl (N-butyl, isobutyl, etc.)
    methoxyamyl
    methoxyhexyl
    methoxydecyl
    methoxylauryl, and the like
    ethoxyethyl
    ethoxypropyl (N-propyl, isopropyl)
    ethoxybutyl (N-butyl, isobutyl, etc.)
    ethoxyamyl
    ethoxyhexyl
    ethoxydecyl
    ethoxylauryl, and the like
    hydroxyethoxyethyl
    chlorohexyl
    hydroxyethoxypropyl
    hydroxyethoxybutyl
    hydroxyethoxyamyl
    hydroxypropoxyethyl
    hydroxypropoxypropyl
    hydroxypropoxybutyl
    hydroxypropoxyamyl
    hydroxybutoxyethyl
    hydroxybutoxypropyl
    hydroxybutoxybutyl
    hydroxybutoxyamyl Suitable bivalent bridging radicals for Y when $n=2$ include:

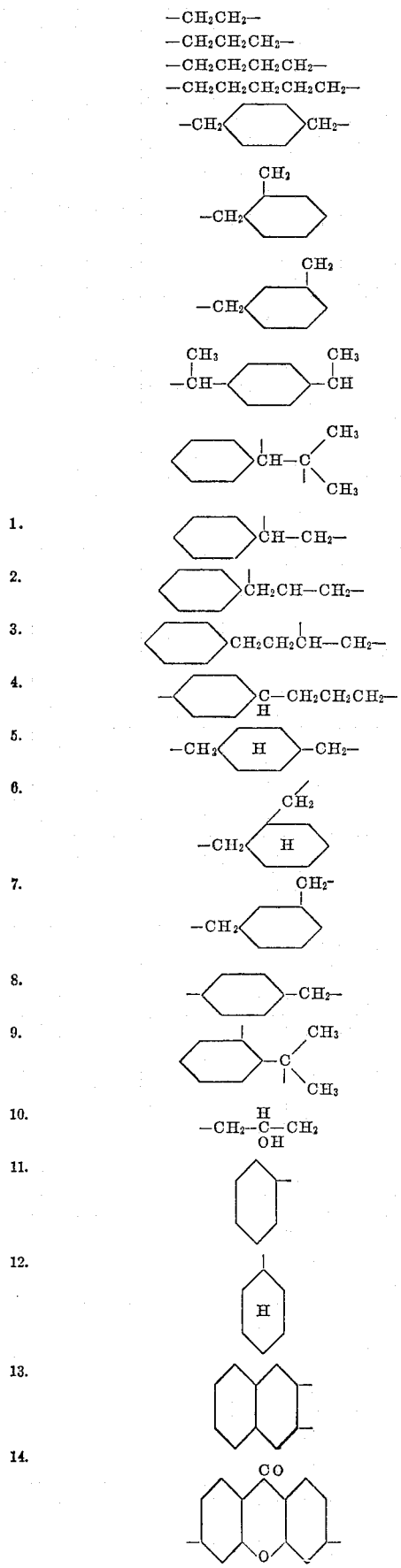

15. 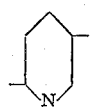

It is of course clear that other non-chromophoric substituents may be present in the above radicals, e.g., —CHClCHCl—
—CHBrCH₂CHBr—

—⟨ ⟩—C(H)(CH₂CH₂OH)—CH₂—CH₂CH₂— and the like.

The general procedure for preparing the compounds used in the present invention involves a condensation of a ketone with a selected cyanomethylene ester preferably in the presence of an acidic catalyst.

Suitable ketones include:

bis(3,5-dimethyl-4-propyl-3-pyrryl) ketone
bis(5-bromo-4-ethyl-3-methyl-2-pyrryl) ketone
bis(3-ethyl-5-methyl-2-pyrryl) ketone
bis(4-ethyl-3-methyl-2-pyrryl) ketone
bis(5-ethyl-3-methyl-2-pyrryl) ketone
bis(5-bromo-2-thienyl) ketone
bis(5-methyl-2-thienyl) ketone
bis(5-chloro-2-thienyl) ketone
5-chloro-2-thienyl-5-bromo-2-thienyl ketone
(5-chloro-2-thienyl)-2-thienyl ketone
5-methyl-2-thienyl-5-bromo-2-thienyl ketone
5-methyl-2-thienyl-5-chloro-2-thienyl ketone
2,5-dimethyl-3-thienyl-5-chloro-2-thienyl ketone
5-chloro-2-thienyl-5-ethyl-2-thienyl ketone
2,5-dimethyl-3-thienyl-2-thienyl ketone
bis(5-methyl-2-thienyl) ketone
bis(2,5-dimethyl-3-thienyl) ketone
2-furyl-3-indolyl ketone
2-furyl-2-thienyl ketone
2-furyl ketone
3-thienyl ketone
2-furyl-2-methyl-3-indolyl ketone
2-furyl-1-methyl-3-indolyl ketone
3-indolyl-2-thienyl ketone
2-pyrryl-2-thienyl ketone
2,5-dimethyl-3-thienyl-2-thienyl ketone
2-pyridyl-4-pyridyl ketone
3-pyridyl-2-pyridyl ketone
5-chloro-2-thienyl-2-furyl ketone
5-chloro-2-thienyl-3-furyl ketone
3-indolyl-5-methyl-2-thienyl ketone
3-indolyl-2-pyridyl ketone
2-thienyl-3-thienyl ketone
2-acetamido-4-phenyl-5-thiazolyl phenyl ketone
2-benzofuryl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl-p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl-2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
4,5-dimethyl-2-thiazolyl phenyl ketone
2,5-dimethyl-3-thienyl phenyl ketone
2,5-dimethyl-3-thienyl p-tolyl ketone
2,5-dimethyl-3-thienyl p-ethylphenyl ketone
2,3-dimethyl-1-naphthyl-2-thienyl ketone 2,5-diphenyl-3-furyl phenyl ketone
4,5-diphenyl-3-isoxazolyl phenyl ketone
1,5-diphenyl-3-pyrryl phenyl ketone
2-furyl-o-tolyl ketone
2-furyl-p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl-2-thienyl ketone
2-methyl-5-benzoxazolyl phenyl ketone
5-methyl-2-thiazolyl phenyl ketone
5-methyl-5-phenyl-4-isoxazolyl phenyl ketone
5-methyl-1-phenyl-1,2,3-triazol-4-yl phenyl ketone
2-methyl-3-pyridyl phenyl ketone
1-naphthyl-2-pyridyl ketone
1-naphthyl-4-pyridyl ketone
1-naphthyl-3-pyridyl ketone
2-naphthyl-3-pyridyl ketone
phenyl-5-phenyl-3-furyl ketone
phenyl-5-phenyl-3-isoxazolyl ketone
phenyl-5-phenyl-3-pyrryl ketone
phenyl-5-phenyl-2-pyrryl ketone
phenyl-5-phenyl-2-thienyl ketone
phenyl-4-thiazolyl ketone
phenyl-5-thiazolyl ketone
phenyl-2-thienyl ketone
phenyl-3-pyrazolyl ketone
phenyl-2-pyridyl ketone
phenyl-4-pyridyl ketone
phenyl-1,2,5-triphenyl-3-pyrryl ketone
phenyl-1-phenyl-4-pyrazolyl ketone
phenyl-6-phenyl-3-pyridyl ketone
phenyl-2-furyl ketone
p-methoxyphenyl-2-thienyl ketone
2-furyl-m-methoxyphenyl ketone
p-hydroxyphenyl-5-methyl-2-thienyl ketone
2,5-dichloro-3-thienyl-phenyl ketone
2,6-dimethyl-4-pyridyl-phenyl ketone
3-allyl-4-hydroxyphenyl-5-ethyl-2-thienyl ketone
3,5-dichloro-2-hydroxyphenyl-2-furyl ketone
3,5-dichloro-4-methoxy-2-pyridyl phenyl ketone
3,5-dichloro-2-pyridyl phenyl ketone
3,5-dimethyl-4-isoxazolyl phenyl ketone
2,4-dimethyl-5-oxazolyl phenyl ketone
p-ethylphenyl-5-ethyl-2-thienyl ketone
4-tertiarybutyl-3-chloro-2-hydroxyphenyl-2-furyl ketone
5-ethyl-2-thienyl-p-methoxyphenyl ketone
6-allyloxy-2,4-xylyl-2-furyl ketone
3'-chloro-4'-methoxy-4-biphenyl-yl-2-thienyl ketone
o-chlorophenyl-5-chloro-2-thienyl ketone In addition to the above contemplated derivatives, polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as:

ethylene oxide
propylene oxide
butylene oxide
butylene dioxide
isobutylene oxide
glycidol
epichlorohydrin
butadiene dioxide
styrene oxide and the like to yield the corresponding polyoxyalkylated products. Among the types of compounds which are reactive in this manner are hydroxy compounds
amide compounds
carboxy compounds, etc.

from one to about 200 moles of oxyalkylating agent may be condensed with the said reactive compounds.

Illustrative active-methylene compounds are:

alkyl α-cyanoacetates, e.g. ethyl α-cyanoacetate
hydroxyalkyl α-cyanoacetates
cyanoalkyl α-cyanoacetates
chloroalkyl α-cyanoacetates
alkenyl α-cyanoacetates, e.g. allyl α-cyanoacetate
phenyl α-cyanoacetate
tolyl α-cyanoacetate
p-carboxyphenyl α-cyanoacetate
decenyl-1-α-cyanoacetate
4-pyrazolyl α-cyanoacetate
4-methyl-2-thiazolyl α-cyanoacetate
4-ethoxyphenyl α-cyanoacetate
p-quinolyl α-cyanoacetate
p-sulfamylphenyl α-cyanoacetate
glyceryl-1,3-bis(α-cyanoacetate)
bis-cyanoacetyl-o-cyclohexylenediol
bis-cyanoacetyl-p-xylylene glycol, and the like The following examples will serve to illustrate the present invention without being deemed limitative thereof. Parts are by weight unless otherwise indicated.

EXAMPLE 1

Allyl-α-cyano-β,β-bis(2-thienyl) acrylate is prepared in the manner described in copending application Ser. No. 244,023 filed Dec. 12, 1962, now abandoned, by condensing allyl α-cyanoacetate with bis (2-thienyl) ketone. The product is then incorporated into a nitrocellulose lacquer as follows:

A mixture of 20 parts of solution I and 80 parts of solution II is prepared wherein solution I consists of:

| | Parts |
|---|---|
| ½ sec. nitrocellulose | 46 |
| Allyl compound | 4 |
| Cellolyn 502 (non-drying plasticizing alkyd resin of Hercules Powder Co.) | 35 |
| Dibutyl phthalate | 15 | and solution II consists of:

| | Parts |
|---|---|
| Butyl acetate | 35 |
| Butanol | 15 |
| Toluene | 50 |

The resulting lacquer solution is drawn out on a metal plate with a Bird film applicator to give a 2 mil film. A similar film is prepared without the allyl compound. Upon exposure to ultraviolet light, the latter film yellows and deteriorates before any visible signs of yellowing are observed in the protected film.

EXAMPLE 2

Example 1 is repeated using the following esters in place of the allyl ester of Example 1.

(a) ethyl ester
(b) hydroxyethyl ester
(c) cyanoethyl ester
(d) propenyl ester
(e) phenyl ester
(f) 2-ethylhexyl ester
(g) 2-ethylhexyloxyethyl ester
(h) tetrahydrofurfuryl ester
(i) cyclohexyl ester Excellent results in stabilization are obtained.

EXAMPLE 3

Examples 1 and 2 are repeated except that in place of bis(2-thienyl) ketone, the following ketones are used to prepare the corresponding α-cyanoacrylates:

(a) bis(2-furyl) ketone
(b) 2-furyl-2-thienyl ketone
(c) 2-pyrryl-2-thienyl ketone
(d) 3-indolyl-2-pyridyl ketone
(e) 5-chloro-2-thienyl-3-furyl ketone
(f) phenyl-2-thienyl ketone
(g) 3,4-dimethoxyphenyl-2-furyl ketone
(h) 2,5-dimethyl-3-thienyl phenyl ketone
(i) 1-naphthyl-2-pyridyl ketone
(j) phenyl-3-pyrazolyl ketone
(k) p-hydroxyphenyl-5-methyl-2-thienyl ketone As in the preceding examples the protection afforded the nitrocellulose film is excellent.

EXAMPLE 4

The compounds of Example 2(f) and 2(g) are incorporated into polyethylene by melting at 125° C. a mixture of 99.7 g. of polyethylene wax p.t. 95504 (Semet-Solvay) and 0.3 g. of absorber. The material is then pressed out in a Carver press to give a film of about 0.03 in. thick. The polyethylene film is well stabilized to ultraviolet light and admirably protects food packaged therein.

EXAMPLE 5

The product of Example 2(d) is incorporated into a synthetic latex as follows:

A 50% dispersion of the absorber of Example 2(d) is made by kneading 20 g. of the compound with 20 g. of formaldehyde-naphthalene-2-sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultraviolet absorber.

EXAMPLE 6

The allyl ester prepared from 2,5-dimethyl-3-thienyl-phenyl ketone is prepared as a 3% solution, in methyl Cellosolve, and a sponge of polyvinyl chloride foam is impregnated therewith. The foam is prepared from the following formulation:

| | Pts. |
|---|---|
| Marvinol VR-10 (polyvinyl chloride resin—U.S. Rubber) | 100. |
| Di-2-ethylhexylphthalate | 130 |
| Barium cadmium stabilizer (Advance BS-105) | 3.5 |
| Celogen (p,p' - oxybis(benzenesulfonyl hydrazide)) | 35 |
| | 268.5 |

The sponge is squeezed free of solvent and dried. It is much more stable to ultraviolet light than untreated material.

EXAMPLE 7

Example 1 is again repeated using the following esters in place of the allyl ester of Example 1:

(a) p-hydroxyphenyl-α-cyanoacetate
(b) p-sulfamylphenyl-α-cyanoacetate

EXAMPLE 8

The compounds of Example 7 are oxyalkylated in an autoclave at 80° C. in the presence of 1.3% KOH as follows:

| Product: | Moles alkylene oxide |
|---|---|
| (a) 7(a) | 6 ethylene oxide. |
| (b) 7(a) | 12 ethylene oxide. |
| (c) 7(a) | 30 ethylene oxide. |
| (d) 7(a) | 10 propylene oxide; then 10 ethylene oxide. |
| (e) 7(b) | 8 ethylene oxide. |
| (f) 7(b) | 15 ethylene oxide. |
| (g) 7(b) | 50 ethylene oxide. |
| (h) 7(b) | 8 butylene oxide; then 20 ethylene oxide. |

EXAMPLE 9

The product of Example 8(b) is used in formulating a liquid detergent as follows:

| | |
|---|---|
| Nonylphenol+10 ethylene oxide condensate | 8 |
| Tetrapotassium pyrophosphate | 26 |
| Low viscosity carboxymethyl cellulose | 0.4 |
| KOH | 2 |
| Water | 57.6 |
| Product of 5(c) | 2 |

Excellent stability to ultraviolet light after 100 hours exposure is obtained.

EXAMPLE 10

The product of Example 8(c) is used to impregnate dyed cotton. The bath contains 3 g./100 ml. water. Excellent protection against ultraviolet light degradation is obtained.

EXAMPLE 11

A 10 gm. swatch of "Dacron" (ethylene glycol terephthalic acid polyester) cloth is heated in an aqueous bath of 0.4 gm. of the compound of Example 1 dispersed in 300 mls. of water at 190° F. for 1 hour. The dispersion is prepared by adding to the 190° F. water while stirring vigorously, a solution of the acrylate in 5 ml. of ethanol. The dried swatch is compared with an untreated sample after both are exposed to ultraviolet light in a fadeometer. After 100 hours, the untreated swatch shows a distinct yellow coloration whereas the treated sample is unchanged.

EXAMPLE 12

Example 11 is repeated employing the compounds disclosed in the following examples:

(a) 2(d)
(b) 1ª–3(c)ᵇ
(c) 1–3(f)
(d) 1–3(h)
(e) 2(a)
(f) 2(a)–3(b)
(g) 2(e)–3(f)
(h) 2(f)–3(j)
(i) 2(c)–3(k)
(j) 2(d)–3(f)
(k) 1–3(g)

The results are similar to those of Example 11.

---

ª Allyl moiety.
ᵇ Refers to the ketone used.

EXAMPLE 13

Examples 11 and 12 are repeated employing the following acrylic textile materials in place of "Dacron":

(a) fibers of homopolyacrylonitrile
(b) fibers of copolymer of 90% acrylonitrile and 10% vinyl pyridine
(c) fibers of copolymer of 40% acrylonitrile and 60% vinyl chloride
(d) fibers of a polymer mixture of 95% polyacrylonitrile and 5% polyvinylpyrrolidone Excellent results are obtained in each instance.

EXAMPLE 14

To 100 gms. of powdered nylon 66 (polyhexamethylene adipamide) are added 1 g. of the absorber of Example 1. After thorough mixing, the mixture is extruded into fibers from a hot melt. A cloth is woven from said fibers and compared with a similar fabric without absorber in the manner of Example 11. The fabric containing the absorber exhibits superior ultraviolet light stability.

EXAMPLE 15

Example 14 is repeated using the following polymers:
(a) "Dacron"
(b) polyethylene
(c) polypropylene
(d) cellulose acetate (2.5 acetyl value)
(e) polyvinylidene chloride

EXAMPLE 16

Example 11 is repeated employing the following bis-esters in place of the allyl ester of Example 11:

(a) glyceryl-1,3-bis(α-cyanoacetate) condensation product
(b) bis-cyanoacetyl-1,3-propanediol condensation product
(c) bis-cyanoacetyl-1,4-butanediol condensation product
(d) bis-cyanoacetyl-4,4′-dihydroxybenzene condensation product
(e) bis-cyanoacetyl-o-cyclohexylenediol condensation product
(f) bis-cyanoacetyl-p-xylyleneglycol condensation product

EXAMPLE 17

Examples 14 and 15 are repeated with the compounds of Example 16. Excellent stabilization against ultraviolet degradation is obtained.

EXAMPLE 18

Example 4 is repeated using the condensation product of propenyl α-cyanoacetate with p-(2-ethylhexyloxy)-phenyl-2-thienyl ketone.

EXAMPLE 19

The allyl α-cyanoacetate condensation product with 4,5-dimethyl-3-pyrryl phenyl ketone is incorporated into a synthetic latex as in Example 5.

EXAMPLE 20

Example 1 is repeated employing the following cyanoacetates in place of the allyl ester:

(a) 4-methyl-2-thiazolyl α-cyanoacetate
(b) 4-pyrazolyl α-cyanoacetate
(c) decenyl-1-α-cyanoacetate
(d) o-chlorotolyl-α-cyanoacetate
(e) crotyl α-cyanoacetate
(f) p-carbomethoxyphenyl α-cyanoacetate
(g) 4-chlorophenyl α-cyanoacetate

EXAMPLE 21

The compound of Example 12(c) is employed in Example 1 to yield an outstanding stabilized film.

EXAMPLE 22

Examples 16 and 17 are repeated using the condensation product with the ketone of Example 3(f).

EXAMPLE 23

The following compounds at a 2% concentration are added to a cosmetic formulation comprising:

| | Parts |
|---|---|
| Petrolatum | 10 |
| Mineral oil | 5 |
| Water | 60 |
| Glyceryl monostearate | 7 |
| Beeswax | 3 |
| Polyvinyl pyrrolidone (K=30) | 1 |

(a) condensation of ethyl α-cyanoacetate with (4-sulfophenyl)-2-thienyl ketone
(b) (4-carboxyphenyl)-2-thienyl acrylic ethyl ester
(c) product 2(a)–3(k) [ethyl ester of the ketone (of 3(k)) condensation product] reacted with 10 moles of ethylene oxide The above-mentioned copending application Ser. No. 244,023 as well as copending application Ser. No. 247,815, now abandoned disclose many of the compounds used in the compositions of this invention. The disclosure in these applications is hereby incorporated by reference thereto.

The compounds employed in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among each different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Example 1.

Other variations in and modifications of the described processes which will be obvious to those skilled in the art can be made in this invention without departing from the scope or spirit thereof.

We claim:
1. An ultraviolet absorbing composition consisting essentially of an organic material susceptible to ultraviolet radiation degradation and as an absorber for ultraviolet radiation, an amount sufficient to prevent degradation of an essentially colorless compound devoid of nitro groups and having the formula:

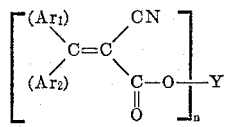

wherein
(a) $Ar_1$ and $Ar_2$ are independently selected from the group consisting of aromatic carbocyclic nuclei and heterocyclic nuclei containing at least one pair of conjugated double bonds and at least one is heterocyclic,
(b) $n$ is an integer from 1 to 2, and
(c) Y is a radical selected from the group consisting of alkyl, aryl, alkenyl, monovalent heterocycic radicals and substituted derivatives thereof wherein said substituents are selected from alkyl, alkenyl, and substituted alkyl wherein the substitutents substituted on said alkyl are selected from cyano, hydroxy, carboalkoxy, chloro, bromo, alkoxy, and hydroxyalkoxy when $n=1$, and
(d) when $n=2$, Y is a bivalent organic bridging radical selected from alkylene, arylene, alkyl aryl alkyl, singly bonded through each alkyl group, aryl alkyl, twice bonded through the alkyl group or singly bonded through both the aryl and alkyl group, alicyclic and heterocyclic radicals.

2. An ultraviolet absorbing composition consisting essentially of an organic material susceptible to ultraviolet radiation from about 0.1% to about 10% by weight based on the weight of said organic material of an essentially colorless compound devoid of nitro groups and having the formula:

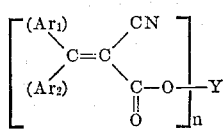

wherein
(a) $Ar_1$ and $Ar_2$ are independently selected from the group consisting of aromatic carbocyclic nuclei and heterocyclic nuclei containing at least one pair of conjugated double bonds and at least one is heterocyclic,
(b) $n$ is an integer from 1 to 2, and
(c) Y is a radical selected from the group consisting of alkyl, aryl, alkenyl, monovalent heterocyclic radicals and substituted derivatives thereof wherein said substituents are selected from alkyl, alkenyl, and substituted alkyl wherein the substituents substituted on said alkyl are selected from cyano, hydroxy, carboalkoxy, chloro, bromo, alkoxy, and hydroxyalkoxy when $n=1$, and
(d) when $n=2$, Y is a bivalent organic bridging radical selected from alkylene, arylene, alkyl aryl alkyl, singly bonded through each alkyl group, aryl alkyl, twice bonded through the alkyl group or singly bonded through both the aryl and alkyl group, alicyclic and heterocyclic radicals.

3. A composition as defined in claim 1 wherein $Ar_1$ is a monocyclic, carbocyclic aromatic nucleus.
4. A composition as defined in claim 1 wherein $Ar_1$ is phenyl and $Ar_2$ is thienyl.
5. A composition as defined in claim 1 wherein $Ar_1$ is phenyl and $Ar_2$ is furyl.
6. A composition as defined in claim 1 wherein $Ar_1$ is naphthyl and $Ar_2$ is thienyl.
7. A composition as defined in claim 1 wherein $Ar_1$ and $Ar_2$ are thienyl.
8. A composition as defined in claim 1 wherein $Ar_1$ and $Ar_2$ are furyl.
9. A composition as defined in claim 1 wherein $Ar_1$ is thienyl and $Ar_2$ is furyl.

10. An ultraviolet light stabilizing film-forming organic composition consisting essentially of a film-forming organic material and in an amount sufficient to stabilize said composition, an essentially colorless compound devoid of nitro groups and having the formula

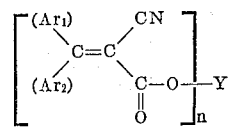

wherein
(a) $Ar_1$ and $Ar_2$ are independently selected from the group consisting of aromatic carbocyclic nuclei and heterocyclic nuclei containing at least one pair of conjugated double bonds and at least one is heterocyclic,
(b) $n$ is an integer from 1 to 2, and
(c) Y is a radical selected from the group consisting of alkyl, aryl, alkenyl, monovalent heterocyclic radicals and substituted derivatives thereof wherein said substituents are selected from alkyl, alkenyl, and substituted alkyl wherein the substituents substituted on said alkyl are selected from cyano, hydroxy, carboalkoxy, chloro, bromo, alkoxy, and hydroxyalkoxy when $n=1$, and
(d) when $n=2$, Y is a bivalent organic bridging radical selected from alkylene, arylene, alkyl aryl alkyl, singly bonded through each alkyl group, aryl alkyl, twice bonded through the alkyl group or singly bonded through both the aryl and alkyl group, alicyclic and heterocyclic radicals.

11. A composition as defined in claim 10 wherein the stabilizer compound is present in an amount from about 0.1% to about 10% by weight based on the weight of the composition.
12. A composition as defined in claim 11 wherein the film forming composition comprises nitrocellulose.
13. A composition as defined in claim 11 wherein the film forming composition comprises polyethylene.
14. A composition as defined in claim 11 wherein the film forming composition comprises a polyvinyl compound.
15. A composition as defined in claim 12 wherein the stabilizer is ethyl α-cyano-β,β-bis(2-thienyl) acrylate.
16. A composition as defined in claim 12 wherein the stabilizer is ethyl α-cyano-β-phenyl-β-(2-thienyl) acrylate.
17. A composition as defined in claim 12 wherein the stabilizer is allyl α-cyano-β,β-bis(2-thienyl) acrylate.
18. A composition as defined in claim 13 wherein the stabilizer is 2-ethylhexyl-α-cyano-β-phenyl-β-(2-thienyl) acrylate.

References Cited

UNITED STATES PATENTS 3,215,724  11/1965  Strobel et al. _____ 260—465
3,215,725  11/1965  Strobel et al. _____ 260—465

GEORGE F. LESMES, Primary Examiner

J. P. BRAMMER, Assistant Examiner

U.S. Cl. X.R.

260—45.8, 2.5, 29.7, 465; 117—122; 106—176